(12) United States Patent
Jurng et al.

(10) Patent No.: US 7,632,780 B2
(45) Date of Patent: Dec. 15, 2009

(54) SOLVOTHERMAL METHOD FOR PREPARING VANADIA-TITANIA CATALYST HAVING NANO STRUCTURE FOR DECOMPOSING CHLORINATED ORGANIC COMPOUNDS

(75) Inventors: Jong Soo Jurng, Seoul (KR); Sung Min Chin, Euijeongbu-si (KR); Ju Young Jeong, Goyang-si (KR); Jung Eun Lee, Seoul (KR); Gwi-Nam Bae, Seoul (KR)

(73) Assignee: Korea Institute of Science and Technology (KR)

( * ) Notice: Subject to any disclaimer, the term of this patent is extended or adjusted under 35 U.S.C. 154(b) by 0 days.

(21) Appl. No.: 12/266,732

(22) Filed: Nov. 7, 2008

(65) Prior Publication Data
US 2009/0123353 A1    May 14, 2009

(51) Int. Cl.
*B01J 23/847* (2006.01)

(52) U.S. Cl. .................................................. 502/350
(58) Field of Classification Search .................. 502/350
See application file for complete search history.

(56) References Cited

U.S. PATENT DOCUMENTS 4,282,116 A * 8/1981 Reuter et al. ................. 502/350

OTHER PUBLICATIONS

JP51(2004)247-254AppCatal, filed Feb. 20, 2004.
JP82(2001)183-188Chem Eng, filed Oct. 31, 2000.
CN54(2004)275-283AppCatal, filed Sep. 8, 2004.
TA270(2007)91-100Jour Mol, filed Jan. 14, 2007.

* cited by examiner

*Primary Examiner*—Stuart Hendrickson
*Assistant Examiner*—Michelle Hou
(74) *Attorney, Agent, or Firm*—Baker & Hostetler, LLP

(57) ABSTRACT

The present invention relates to a method for preparing a vanadia-titania catalyst having a core-shell structure, which is highly active in decomposing chlorinated organic compounds such as dioxin present in the exhaust of an incinerator.

10 Claims, 3 Drawing Sheets

SOLVOTHERMAL METHOD FOR PREPARING VANADIA-TITANIA CATALYST HAVING NANO STRUCTURE FOR DECOMPOSING CHLORINATED ORGANIC COMPOUNDS

FIELD OF THE INVENTION

The present invention relates to a solvothermal method for preparing a vanadia-titania catalyst having a nano structure for decomposing chlorinated organic compounds.

BACKGROUND OF THE INVENTION

Vanadia-titania catalysts have been broadly used to decompose environmentally harmful chlorinated organic compounds generated during incineration or combustion of organic waste. A vanadia-titania catalyst is capable of decomposing such chlorinated organic compounds through an oxidation-reduction reaction, emitting a harmless exhaust gas to the environment.

Generally, such vanadia-titania catalyst is prepared by a wet synthetic method such as impregnation and coprecipitation methods. For example, an aqueous vanadium salt solution is impregnated to a molded titania pellet or powder, and the resulting material is dried and calcined. However, the titania used in the existing wet synthetic method is of an anatase form having a low specific surface area and low thermally stability, and the anatase form of the titania converts in part into the rutile form during the high temperature treatment step, which leads to an inactive catalyst. To avoid such problems, there has developed a modified method that involves an elaborated multi-step procedure and requires a number of days to complete.

There has been reported another method for preparing a vanadia-titania aerogel catalyst by drying a vanadia-titania wet gel prepared by a sol-gel method, which is conducted under a supercritical condition of carbon dioxide and dried also under a supercritical condition. However, this method also has difficulties in that it takes several days to age the gel and that the drying process must be conducted under a supercritical condition.

Therefore, the present inventors have endeavored to develop an improved method for preparing a vanadia-titania catalyst, which can be used for converting a chlorinated organic compound into environmentally harmless products, and have found a solvothermal method for preparing a particulate form of a vanadia-titania catalyst having a core-shell structure, which effectively converts chlorinated organic compounds.

SUMMARY OF THE INVENTION

Accordingly, it is an object of the present invention to provide an improved method for preparing a vanadia-titania catalyst having a nano structure obtained by a solvothermal procedure for the conversion of chlorinated organic compounds into harmless materials.

In accordance with one aspect of the present invention, there is provided a method for preparing a vanadia-titania catalyst having a nano structure by a solvothermal procedure, which comprises the steps of:

1) transporting a solution containing a vanadia precursor and a titania precursor to a hot section of a reactor heated with an electric furnace using a carrier gas and air;

2) subjecting the solution containing the vanadia and the titania precursors to a solvothermal procedure at the hot section to obtain a vanadia-titania catalyst particle having a core-shell structure of a titanium dioxide core coated with vanadia particles; and 3) cooling and collecting the vanadia-titania catalyst particle having the core-shell structure.

In accordance with another aspect of the present invention, there is provided a vanadia-titania catalyst having the core-shell nano structure prepared by the above method for decomposing a chlorinated organic compound.

In accordance with further another aspect of the present invention, there is provided a method for decomposing the chlorinated organic compound by using the vanadia-titania catalyst having a nano structure.

BRIEF DESCRIPTION OF DRAWINGS

The above and other objects and features of the present invention will become apparent from the following description of the invention taken in conjunction with the following drawings, which respectively show.

DETAILED DESCRIPTION OF THE INVENTION

Figure 1:
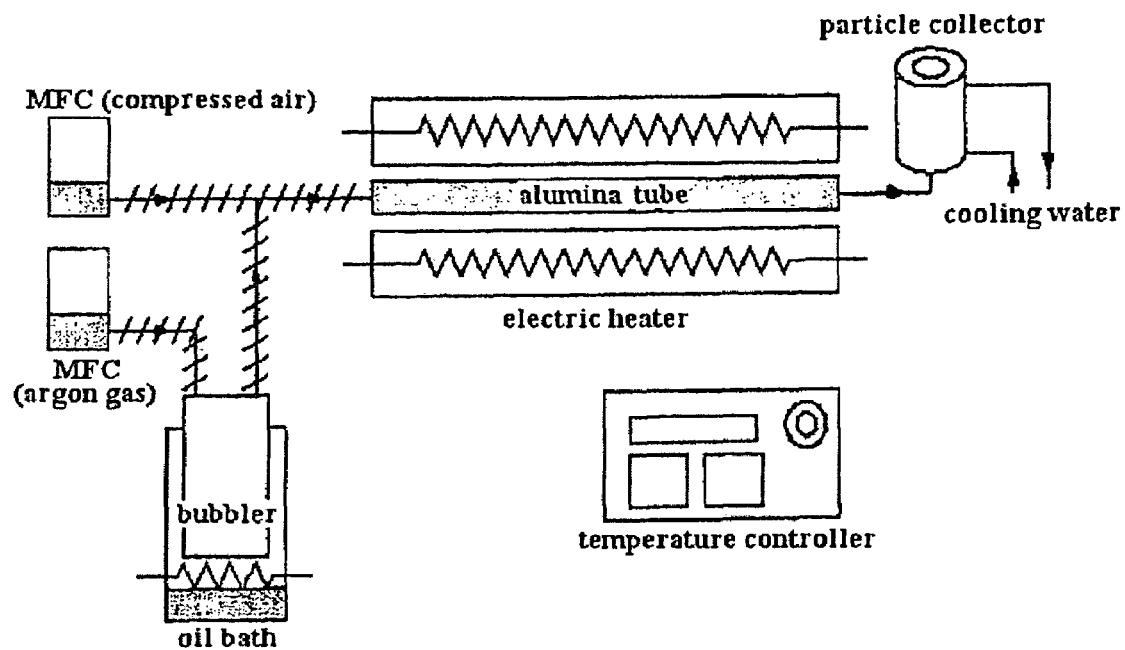
FIG. 1: a diagram of a device for preparing a vanadia-titania catalyst having a core-shell nano structure by the solvothermal procedure according to the present invention.

The method for preparing the vanadia-titania catalyst according to the present invention is characterized by providing the solution of the vanadia and titania precursors to the hot section of a reactor heated with an electric furnace to prepare the vanadia-titania catalyst having a core-shell structure of a titanium dioxide core coated with vanadia particles for effectively decomposing chlorinated organic compounds by a solvothermal procedure.

Specifically, the method for preparing the vanadia-titania catalyst having a nano structure by the solvothermal procedure according to the present invention comprises the steps of:

1) transporting a solution containing a vanadia precursor and a titania precursor to a hot section of a reactor heated with an electric furnace using a carrier gas and air;

2) subjecting the solution containing the vanadia and the titania precursors to a solvothermal procedure at the hot section to obtain a vanadia-titania catalyst particle having a core-shell structure of a titanium dioxide core coated with vanadia particles; and 3) cooling and collecting the vanadia-titania catalyst particle having the core-shell structure.

Hereinafter, the method of the present invention will be described in more details by referring to FIG. 1.

In Step 1), the solution containing a vanadia precursor and a titania precursor is prepared, and then the solution is transported to the hot section of the reactor heated with the electric furnace using the carrier gas and air.

The vanadia precursor used in step 1) may be vanadium (V) oxytripropoxide ($(C_3H_7O)_3VO$), and the titania precursor may be titanium tetraisopropoxide (TTIP, $Ti[OCH(CH_3)_2]_4$). The solution is prepared by mixing the vanadia precursor and the titania precursor in a weight ratio of 3.5:96.5 to 15:85. If the mixing ratio of the vanadia precursor and the titania precursor is beyond the above range, the dioxin decomposition efficiency of the produced vanadia-titania catalyst may be reduced.

The solution thus obtained is placed in an evaporator containing a bubbler heated with an oil bath and the carrier gas is injected into the evaporator to transport the solution to the hot section of the reactor heated with the electric furnace.

The carrier gas used in the present invention may be an inert gas such as nitrogen or argon, and the air may be a compressed air. The flow rate ratio of the carrier gas and air is in a range of 1:5 to 1:10, and it is an optimal condition of an oxygen concentration comprised in the air required to produce the particle.

The injection temperature of the carrier gas and air in the evaporator may be controlled to a range from 80 to 110° C. with a temperature controller in consideration of a boiling point of each precursor. If the injection temperature is lower than 80° C., the amount of the synthesized particle is too small to prepare the catalyst, and if the injection temperature is higher than 110° C., the amount of the synthesized particle is too large, so that the particle is attached to the surface of the tube, thereby resulting in clogging the tube.

In Step 2), the solution containing the vanadia and the titania precursors is subjected to the solvothermal procedure at the hot section to obtain a vanadia-titania catalyst particle having a core-shell structure of a titanium dioxide core coated with vanadia particles.

The electric furnace used in the present invention preferably comprises electric heaters at upper and lower parts thereof and an alumina tube which is disposed between the electric heaters. The precursor mixture solution transported to the electric furnace by the carrier gas is subjected to the solvothermal procedure while passing through the alumina tube equipped in the electric furnace.

The vanadia and titania precursors used in the present invention comprises a vanadium and titanium in the middle thereof, respectively, and have organic metal compound structures wherein 3 propyl groups and 4 isopropyl groups are bound to a metal atom through an oxygen atom. In this step, there is no process providing an organic solvent for the solvothermal procedure because the precursors are a liquid at the room temperature. The solvothermal procedure is carried out at 900 to 1,100° C. for 1 sec to 1 min. If the temperature is lower than 900° C., the noncrystallization may be caused, and if the temperature is higher than 1,100° C., the catalyst function may be decreased by converting an anatase form into a rutile form and increasing the produced particle size. Further, the particle size may be controlled according to the treating time, i.e., the particle size is increased as the treating time goes longer, and the particle size and the specific surface area thereof may be controlled according to the purpose of the catalyst. The temperature of the alumina tube is controlled by the electric heater equipped at the upper and lower parts thereof. The electric heater keeps the temperature of the alumina tube constantly, and may prevent particle aggregation caused by rapid cooling of the nano particles formed by the solvothermal procedure in the alumina tube.

In this step, in the precursor mixture solution subjected to the solvothermal procedure, a propyl group is evaporated from the surface of the precursor and exhausted, and the vanadia particle is coated to the surface of the titanium dioxide carrier in the membrane structure to prepare the vanadia-titania catalyst particle having a core-shell structure. The amount of the vanadia in the prepared vanadia-titania catalyst may be 3 to 15 weight % based on the total catalyst, preferably. If the amount of the vanadia is lower than 3 weight %, the catalyst function may be decreased because the particle number of the vanadia as an active site is too small, and if the amount of the vanadia is higher than 15 weight %, the vanadia layer on the titania surface becomes thick and the catalyst function is reduced by weakening the interaction of the vanadia and titania.

In Step 3), the vanadia-titania catalyst produced in Step 2) having a core-shell structure is cooled to a temperature lower than 100° C. and collected.

Generally, in order to collect a nano particle, there is a method rapidly cooling the synthesized particle by using a thermophoresis followed by collecting on a thermophoresis board, but the surface temperature of the thermophoresis board is increased as the particle is collected, thereby resulting in decreasing the particle collection efficiency and taking too much time for collection. Therefore, in the present invention, in order to enhance the particle collection efficiency, a double tube particle collection device is invented, and a cooling water is passed through the tube to collect the particle by rapid cooling and at the same time to prevent the temperature of the particle collector from continuously increasing during the collection to improve the particle collection efficiency. Using the double tube particle collection device according to the present invention is very efficient because it may improve the particle collection efficiency and decrease the particle collection time. In a preferred example of the present invention, the produced catalyst particle is collected every 2 hours.

The method of the present invention using the solvothermal procedure has a merit of mass producing the vanadia-titania catalyst by a simple and successive procedure, as compared with the conventional wet method. The existing wet method requires several steps such as dissolving, drying and calcinating to prepare the particle, so that the particle cannot be prepared by a single process, but the inventive method is capable of successively operating the device by a single process, thereby resulting in successively preparing the vanadia-titania catalyst particle.

Further, the vanadia-titania catalyst prepared by the inventive method has a diameter of tens of nano ($10^{-9}$ m) and core-shell structure, wherein the vanadia content is 3 to 15 weight % based on the total catalyst. Therefore, the catalyst having large reaction surface area to the chlorinated organic compound and excellent physical stability may decompose the chlorinated organic compounds more effectively even at a low temperature of 150 to 300° C., compared with the catalyst prepared by the wet method.

The following Examples are intended to further illustrate the present invention without limiting its scope.

EXAMPLE 1

Preparation of a Vanadia-Titania Catalyst by a Solvothermal Method

Vanadium (V) oxytripropoxide ($(C_3H_7O)_3VO$) was added to a TTIP ($Ti(OCH(CH_3)_2)_4$) solution in a suitable amount such that the vanadia content of the final catalyst became 3.5 weight %, to obtain a precursor mixture, which was placed in a bubbler heated with an oil bath (see FIG. 1). Argon and a compressed air were each injected into the precursor solution kept in the bubbler which was maintained at 110° C. Argon and the compressed air were injected at flow rates of 700 ml/min and 7.0 l/min, respectively. The carrier gases transferred the precursor mixture to a hot section of an alumina tube maintained at 1,100° C. using an electric furnace, to obtain a particulate vanadia-titania catalyst having the form of a core-shell structure composed of a titanium dioxide substrate core coated with vanadia particles. The vanadia-titania catalyst particles thus obtained were cooled to 50° C. using cooling water and passed through a particle collector, and the collecting performed every 2 hours.

Figure 2:
FIG. 2: a TEM (transmission electron microscope) photograph of the nano structure of the vanadia-titania catalyst prepared by the solvothermal procedure according to the present invention.

FIG. 2 is TEM (transmission electron microscope) photograph of the vanadia-titania catalyst obtained above which contained vanadia in an amount corresponding to 3.5 weight % based on the total weight of the particle, and it is confirmed that the catalyst had a core-shell nano structure wherein the surface of the titanium dioxide core is coated with vanadia particles.

COMPARATIVE EXAMPLE 1

Preparation of a Vanadia-Titania Catalyst by an Impregnation Method

A vanadia-titania catalyst was prepared by the conventional impregnation process. Aqueous solvents of vanadium (V) oxytripropoxide was used to impregnate a commercial titania (Degussa, P-25) powder, and dried to obtain a comparative vanadia-titania catalyst having a vanadia content of 3.5 weight %.

TEST EXAMPLE 1

In order to identify the optimal activation condition of the vanadia-titania catalyst prepared in Example 1 by the solvothermal method, a test was carried out using 1,2-dichlorobenzene (1,2-DCB), which is one of the most toxic chlorinated organic compounds present in the exhaust gas of an incinerator, and is often used as a viable alternative of dioxin for the test purpose.

Specifically, 0.1 g of the vanadia-titania catalyst prepared in Example 1 was charged in a fixed bed reactor, and the reactivity was checked for 2 hours at a temperature of 150° C. to 300° C., while raising the temperature by an increment of 50° C. 1,800 ppm of 1,2-DCB in air (an oxidant) was injected to the reactor at a space velocity of 22,000 $h^{-1}$. The respective samples collected from the top and the bottom of the catalyst layer were analyzed with a GC/FID (gas chromatography with flame ionization detector) to measure the initial and the final concentrations of the 1,2-DCB. The efficiency for decomposing 1,2-DCB by the vanadia-titania catalyst was determined by measuring the amount of the 1,2-DCB exiting the reactor based on the initial concentration. Similar comparative experiments were conducted using the vanadia-titania catalyst prepared in Comparative Example 1 and a commercial catalyst (Kocat Inc., SCR (selective catalytic reduction) catalyst).

Figure 3:
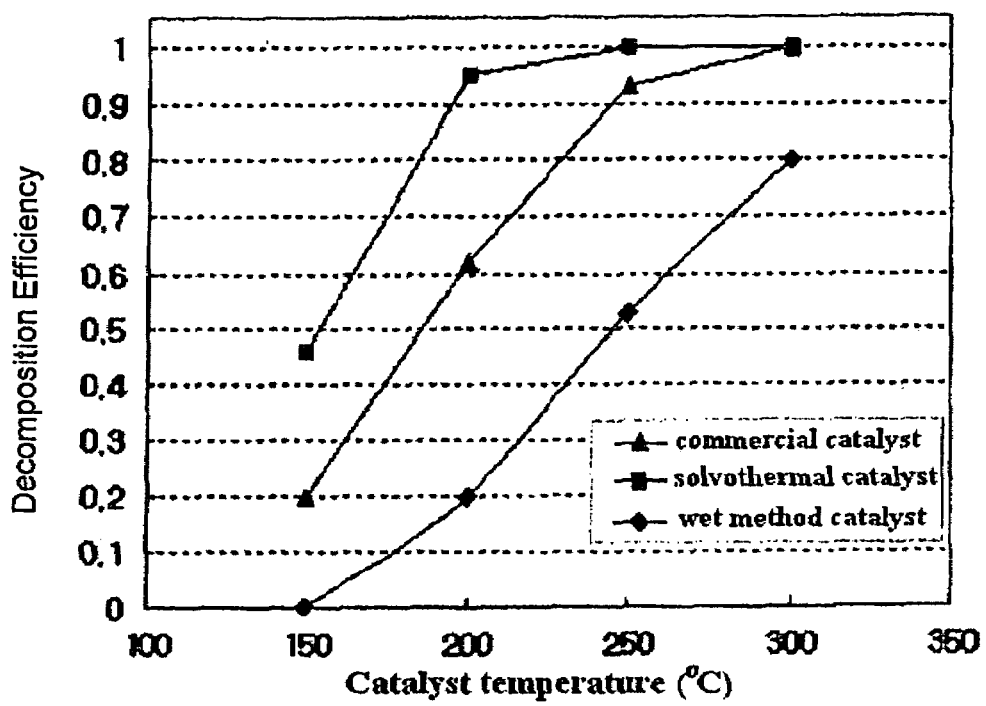
FIG. 3: the 1,2-dichlorobenzene (1,2-DCB) decomposition activity of the vanadia-titania catalyst prepared by the solvothermal procedure according to the present invention and those of a commercial catalyst and a catalyst prepared by a wet method.

As shown in FIG. 3, the activity to decompose 1,2-DCB increased with the reaction temperature, and it also varied widely depending on the preparation method used. Specifically, the vanadia-titania catalyst prepared by the solvothermal method according to the present invention showed an activity which was higher by about 70% at 200° C., and about 50% at 250° C., as compared with that of the catalyst prepared by the wet method. Further, the vanadia-titania catalyst of the present invention showed an activity which was higher by about 25% at 200° C., and about 30% at 250° C., as compared with that of the commercial catalyst.

While the invention has been described with respect to the above specific embodiments, it should be recognized that various modifications and changes may be made and also fall within the scope of the invention as defined by the claims that follow.

What is claimed is:

1. A method for preparing a vanadia-titania catalyst having a nano structure by a solvothermal procedure, which comprises the steps of:
   1) transporting a solution containing a vanadia precursor and a titania precursor to a hot section of a reactor heated with an electric furnace using a carrier gas and air;
   2) subjecting the solution containing the vanadia and the titania precursors to a solvothermal procedure at the hot section to obtain a vanadia-titania catalyst particle having a core-shell structure of a titanium dioxide core coated with vanadia particles; and
   3) cooling and collecting the vanadia-titania catalyst particle having the core-shell structure.

2. The method of claim 1, wherein the weight ratio of the vanadia precursor and the titania precursor used in step 1) is in the range of 3.5:96.5 to 15:85.

3. The method of claim 1, wherein, in step 1), the vanadia precursor is vanadium oxytripropoxide ($(C_3H_7O)_3VO$), and the titania precursor is titanium-tetraisopropoxide (TTIP, $Ti(OCH(CH_3)_2)_4$).

4. The method of claim 1, wherein the flow rate ratio of the carrier gas and air used in step 1) is in the range of 1:5 to 1:10.

5. The method of claim 1, wherein the temperature of the carrier gas and air is in the range of 80 to 110° C.

6. The method of claim 1, wherein the carrier gas used in step 1) is nitrogen or argon.

7. The method of claim 1, wherein the air used in step 1) is a compressed air.

8. The method of claim 1, wherein the solvothermal procedure of step 2) is carried out at 900 to 1,100° C. for 1 sec to 1 min.

9. The method of claim 1, wherein the vanadia-titania catalyst particle is cooled in step 3) to a temperature lower than 100° C.

10. The method of claim 1, wherein, the vanadia content of the collected vanadia-titania catalyst of step 3) is 3 to 15 weight % based on the total catalyst.

* * * * *